United States Patent
Trzeciak et al.

(10) Patent No.: US 7,349,325 B2
(45) Date of Patent: Mar. 25, 2008

(54) BROADBAND OVER LOW VOLTAGE POWER LINES COMMUNICATIONS SYSTEM AND METHOD

(75) Inventors: Andrzej Trzeciak, Lake Barrington, IL (US); Benjamin G. Roberto, Lisle, IL (US); Janusz Swiatek, Schaumburg, IL (US); Kevin Lacey, Oak Park, IL (US); David G. Padgitt, Schaumburg, IL (US); Paul Odlyzko, Arlington Heights, IL (US); Gary D. Schulz, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 365 days.

(21) Appl. No.: 11/207,432

(22) Filed: Aug. 19, 2005

(65) Prior Publication Data

US 2006/0269000 A1    Nov. 30, 2006

(51) Int. Cl.
*H04J 11/00* (2006.01)
(52) U.S. Cl. .................. 370/208; 370/401; 375/257
(58) Field of Classification Search ............... 370/400, 370/401, 441, 445, 465, 466; 340/310.01, 340/310.11, 310.12; 375/257; 713/150, 713/151, 189; 709/223
See application file for complete search history.

(56) References Cited

U.S. PATENT DOCUMENTS

| | | | |
|---|---|---|---|
| 6,686,832 B2 * | 2/2004 | Abraham | 370/203 |
| 7,053,756 B2 * | 5/2006 | Mollenkopf et al. | 375/258 |
| 7,194,528 B1 * | 3/2007 | Davidow | 709/223 |

* cited by examiner

*Primary Examiner*—Chi Pham
*Assistant Examiner*—Alexander O. Boakye
(74) *Attorney, Agent, or Firm*—Randi L. Karpinia

(57) ABSTRACT

A power line communications (PLC) system and method for providing broadband communications over a low voltage power line are disclosed. The system and method comprise a manager that controls access to a bridge for a client where the bridge communicates with the manager to provide the client Internet access. The bridge modulates Ethernet communications from the Internet access to the low voltage power line to provide the modulated Ethernet communications to the client and the client demodulates modulated Ethernet communications from the low voltage power line to yield Ethernet communications.

18 Claims, 6 Drawing Sheets

BROADBAND OVER LOW VOLTAGE POWER LINES COMMUNICATIONS SYSTEM AND METHOD

FIELD OF THE INVENTION

The present invention relates generally to power line communications (PLC) and in particular to the field of providing low voltage broadband over power lines communications.

BACKGROUND

Power is provided to users worldwide through a power distribution system where power is typically generated at a power generation facility by converting some form of potential or kinetic energy into electricity through the use of electrical generators. The generated power is delivered over a large distance from the power generation facility through a series of substations using Medium Voltage (MV) power lines at typically 4-30 KV voltage levels to consumers by using transformers that connect the MV power lines to produce Low Voltage (LV) electricity that is typically in the 110-600 V voltage range.

Power Line Communications (PLC) reuse the power distribution system for the delivery of information. As is known in the art, PLC systems typically superimpose an information signal on the MV power lines to deliver information to a customer operating on LV power at the customer's premise (CP). Customers of the PLC subscribe to communications access as a means to reach the Internet or as a means to implement a virtual private network.

Using the MV power lines to deliver information is not ideal. The power line environment, especially when using overhead lines, is electrically noisy with many narrowband noise sources and significant broadband noise. Further, it is technically challenging to introduce RF signals onto the MV power lines and extract RF signals from the MV power lines. Further, it may be difficult to isolate RF signals on the MV power line as the medium may not be conducive to the filtering of high frequency signals. Further yet, installation of equipment to deliver information on the MV power lines is expensive since working with MV power lines requires specialized and experienced electricians. Because of these challenges, it is advantages and desirable to provide a broadband communications service over low voltage power lines.

BRIEF DESCRIPTION OF THE FIGURES

The present invention is illustrated by way of example and not limitation in the accompanying figures, in which like references indicate similar elements, and in which.

Figure 1:
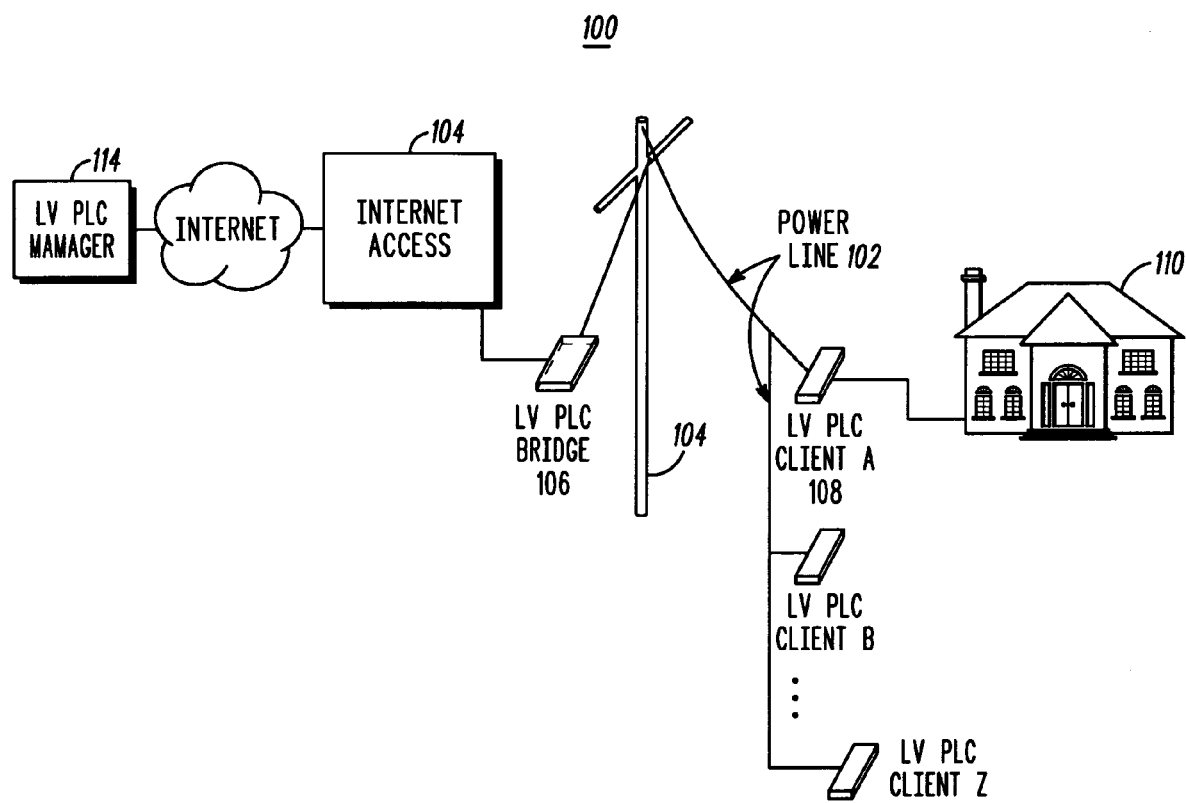
FIG. 1 is an example of a simple block diagram illustrating a LV PLC communications system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components related to control channel architectures. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, shown is a broadband over low voltage (LV) power lines communications (PLC) system 100 in accordance with an embodiment of the present invention. The LV PLC system 100 comprises a LV power line 102, Internet access 104, a LV PLC bridge 106, a LV PLC client 108, and a LV PLC manager 114. Typically, the LV power line 102 supplies power in the range of 110-600 V to a customer, e.g. 110. Shown in FIG. 1 are three LV PLC clients 108, namely LV PLC client A, LV PLC client B, and LV PLC client Z; however the number of LV PLC clients supported by one LV power line 102 is determined by power management specifications that are beyond the scope of this disclosure.

Internet access 104 provides Internet 112 access for the LV PLC system 100 and is shown as one box for simplicity. However, Internet access 104 may comprise backhaul, access points, routers, gateways, and other networking equipment necessary for providing the LV PLC system 100 access to the Internet 112. For example, in one embodiment, Internet access 104 comprises a subscriber module in wireless communication with an access point where the access point is connected to a wired network (not shown), such as the Internet 112. In one embodiment, the wireless communications within Internet access 104 are communicated using orthogonal frequency division multiplexing (OFDM). In any case, Internet access 104 provides Internet 112 access via Ethernet communications to the LV PLC bridge 106. In an exemplary embodiment, the Internet access 104 comprises Canopy products manufactured by Motorola, Inc. to provide wireless broadband access.

The LV PLC bridge 106 receives Ethernet communications from Internet access 104 and injects the received Ethernet communications on the LV power line 102 so that the LV PLC client 108 can receive the injected Ethernet communications. As such the LV PLC bridge 106 interfaces between the Internet access 104 and connects to the power line 102, namely a transformer of the power line. In an exemplary embodiment, the LV PLC bridge 106 has an Internet Point of Presence (POP) and is IP addressable. In an alternative embodiment, the Internet POP is located within the Internet access 104. In any case, the LV PLC bridge 106 receives Ethernet communications from the Internet access 104 and modulates Ethernet communications to be conveyed over the power line 102. In addition, the LV PLC bridge 106 receives modulated Ethernet communications from the LV PLC client 108 and demodulates the modulated Ethernet communications to be forwarded to the Internet access 104. In one embodiment, the modulation and demodulation of the Ethernet communications is performed according to a HomePlug 1.0 specification. As such the modulation, demodulation, transmission, reception, and framing of Ethernet communications is defined in the HomePlug specification as defined by the HomePlug™ Powerline Alliance.

The LV PLC client 108 receives the modulated Ethernet communications from the LV power line 102 and provides demodulated Ethernet communications to devices at a customer 110. As such, the LV PLC client 108 performs demodulation of received modulated Ethernet communications and forwards the Ethernet communications to devices at the customer 110. In addition, the LV PLC client 108 performs modulation of received Ethernet communications from the devices at the customer 110 and conveys the modulated Ethernet communications to the power line 102. Example devices include computers, laptops, wireless routers, Internet Protocol (IP) enabled appliances, and the like. In additional embodiments, the LV PLC client 108 also provides management of quality of service of the Ethernet communications, authentication of the customer, and serves as a firewall between the customer and the Internet and/or other customers. In one embodiment, the LV PLC client 108 provides visual knowledge of the performance of the LV PLC system 100 by indicating power, activity, and data transfer of Ethernet communications by LED lights on the LV PLC client 108.

The LV PLC manager 114 serves as a bandwidth access manager (BAM) for the LV PLC system 100. As such the LV PLC manager 114 functions a single point of management for the LV PLC system 100.

Figure 2:
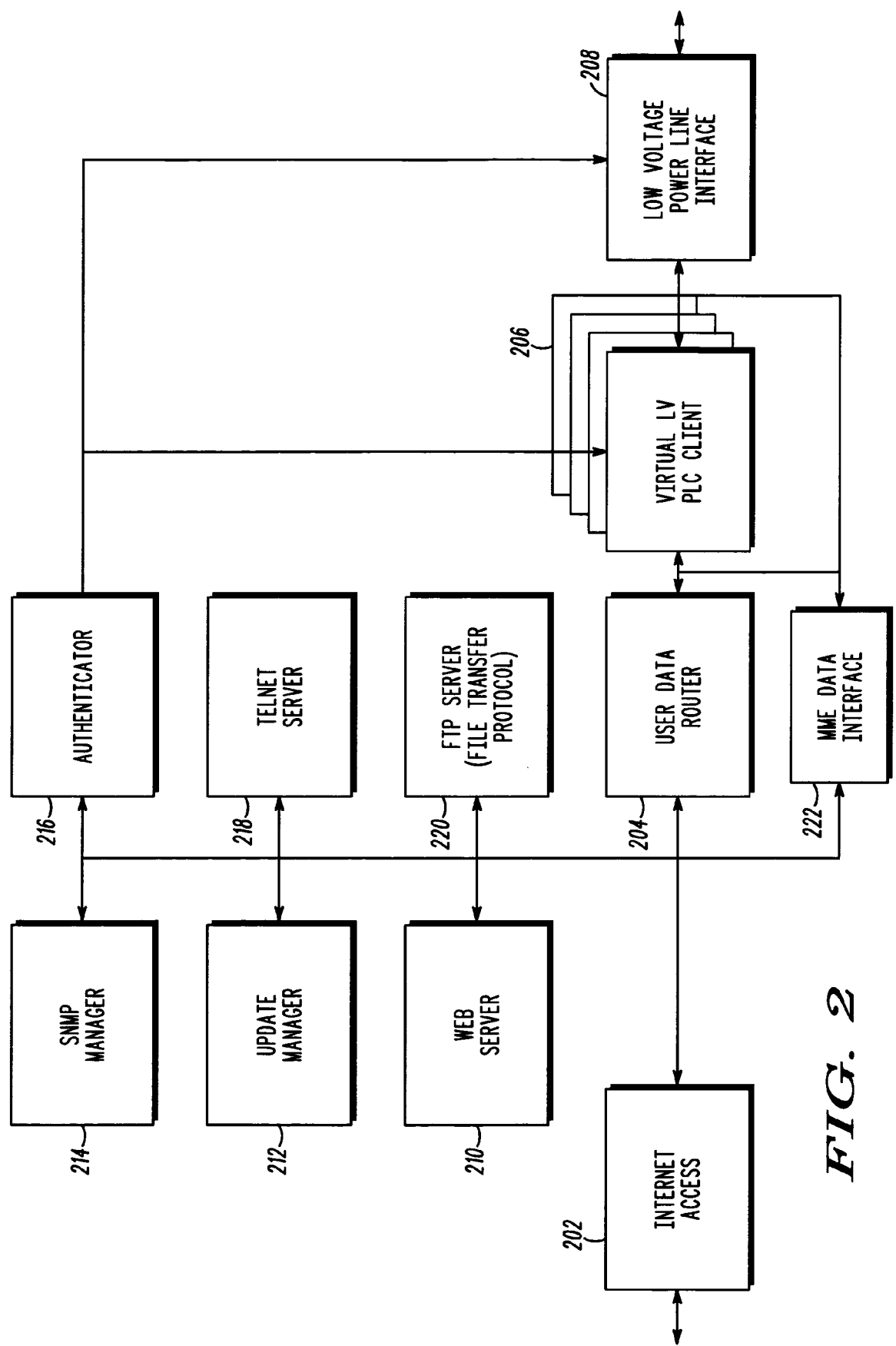
FIG. 2 is an example of a simple block diagram illustrating a LV PLC bridge in accordance with some embodiments of the invention.

Shown in FIG. 2 is an exemplary block diagram of the functionality provided by the LV PLC bridge 106. An Internet access interface 202 functions to interface to the Internet access 104 and may be considered the Internet POP. The Internet access interface 202 is generally described as a standard Ethernet interface and described by an IEEE 802.3 standard. Further, the Internet access interface 202 receives Ethernet communications either destined for use within the LV PLC bridge 106 or for a LV PLC client 108.

If the Ethernet communications are destined for a LV PLC client 108, then a user data router 204 functions to take Ethernet communications from the Internet access interface 202 and determines which LV PLC client 108 that the IP data packet is destined for. The user data routing 204 functions as a soft switch by looking at a destination address in the Ethernet communications from the Internet access 104 to determine the LV PLC client 108 that the Ethernet communications are intended for. The user data router 204 routes the Ethernet communications to an appropriate virtual LV PLC client 206 representing the LV PLC client 108 that the Ethernet communications are intended for. As shown in FIG. 2, the virtual LV PLC client 206 is more than one entity where the number of virtual LV PLC clients in the LV PLC bridge 106 is equal to the number of LV PLC clients 108 in the LV PLC system 100. Thus, there is a one to one mapping between the number of virtual LV PLC clients 206 and the number of LV PLC clients 108. Further, each virtual LV PLC client 206 performs a client specific encryption and decryption of Ethernet communications. As used herein, client specific means that Ethernet communications encrypted for a first client can not be decrypted by a second client and Ethernet communications encrypted by a first client can not be decrypted by a second client.

Finally, the power line interface 208 modulates and demodulates encrypted Ethernet communications to and from the power line 102. Specifically, the power line interface 208 takes the encrypted Ethernet communications that are encrypted by the virtual LV PLC 206 and modulates the encrypted Ethernet communications according to the HomePlug specification. Then, the modulated encrypted Ethernet communications are broadcast to each LV PLC client 108 in the LV PLC system 100.

Referring to FIG. 2, if the LV PLC bridge receives Ethernet communications that are destined for use within the LV PLC bridge 106, then various processes, namely 210-220 of FIG. 2, of the LV PLC bridge 106 process the Ethernet communications. A web server 210 provides http-based control, configuration, and monitoring of the LV PLC bridge 106. Further the web server 210 provides for remote configuration, operation, and management of the LV PLC bridge 106. As is known in the art, a web server 210 is a visualization or a graphical user interface for an underlying process. In this case, the web server 210 is a visualization of an update manager 212.

The update manager 212 is the underlying process for remote configuration, operation, and management of the LV PLC bridge 106 and/or a LV PLC client. The update manager 212 allows the LV PLC manager 114 to remotely provide a firmware upgrade to the LV PLC bridge 106 and/or a LV PLC client 108. The update manager 212 is responsible for receiving firmware upgrades and validating the correctness of the received firmware upgrade before it is installed in either the LV PLC bridge 106 and/or the LV PLC client 108.

A simple network management protocol (SNMP) manager 214 monitors Ethernet communications to collect statistics relating to the operation of the LV PLC bridge 106. For example, the SNMP manager 214 collects statistics such as a number of successful packets received by the LV PLC bridge, a number of packets destined for the web server 210, and a number of packets destined for a specific LV PLC client 108. Further, the SNMP manager 214 maintains the configuration of the LV PLC bridge 106. The SNMP manager 214 is able to selectively control the operation of a specific LV PLC client 108.

An authenticator 216 functions as the local authentication process for the LV PLC system 100 and interfaces with the authentication process performed by the LV PLC manager 114 and the LV PLC client 108. Specifically, the authenticator 216 serves as a proxy for the LV PLC client 108. As such, the authenticator 216 sends and receives authentication messages to and from the client 108 over the power line interface 208. As will be further described with reference to FIGS. 4-6, information in authentication messages exchanged between the authenticator 216 of the LV PLC bridge 106 and the LV PLC client 108 is conveyed to the LV PLC manager 114.

A telnet server 218 provides another vehicle for remote configuration, operation, and management of the LV PLC bridge 106. The telnet server 218 is a text based user interface whereas the web server 210 is a graphical user interface. A file transfer protocol (FTP) server is a file transfer conveyance that is principally used by the update manager 212 to receive and send data to and from the LV PLC manager 114.

Further, shown in FIG. 2 is a MME data interface 222 that provides packetized communications to LV PLC clients 108 and communicates with a MME data interface 320 of the LV PLC clients 108. In an exemplary embodiment, the MME data interface 320 conforms to the HomePlug 1.0 specification. The MME data interface 222 detects the presence of new LV PLC clients 108 and the loss of existing LV PLC clients 108. For example, when a new LV PLC client 108 is plugged in, the MME data interface 320 of the LV PLC bridge 106 detects the presence of the new LV PLC client 108. Then, the MME data interface 222 interfaces with the authenticator 216 to validate the new LV PLC client 108. Assuming, that the authenticator 216 in communication with the LV PLC manager 114 confirms that the new LV PLC client 108 is able to communicate within the LV PLC system 100, then the MME data interface 222 provides configuration information from the virtual LV PLC client 206 to the new LV PLC client 108 to utilize the LV PLC system 100. Further, the MME data interface 222 coordinates encryption/decryption within the LV PLC client 108 with the virtual LV PLC client 206 of the LV PLC bridge 106.

Figure 3:
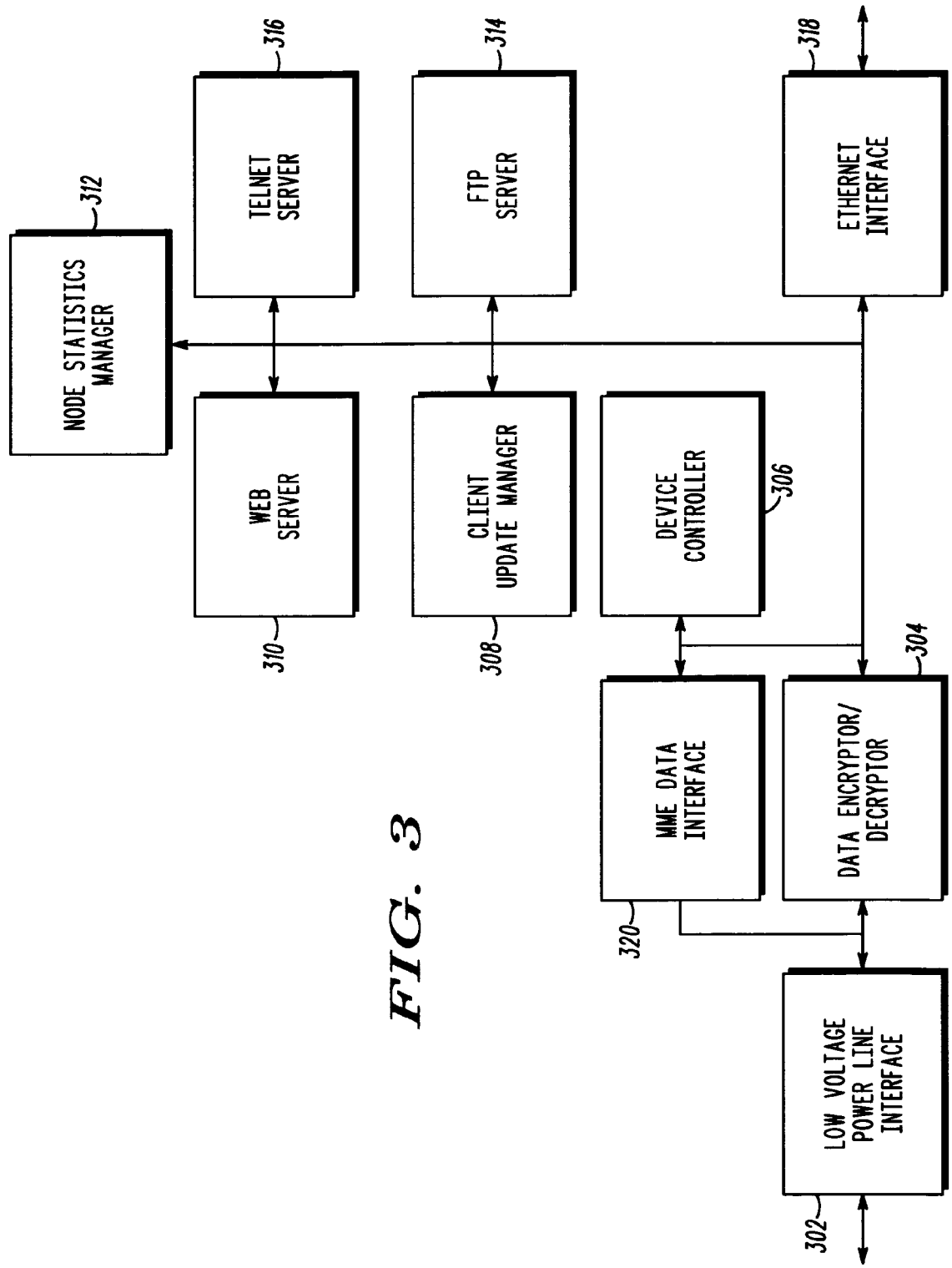
FIG. 3 is an example of a simple block diagram illustrating a LV PLC client in accordance with some embodiments of the invention.

Shown in FIG. 3 is an exemplary block diagram of the functionality provided by the LV PLC client 108. The LV PLC client 108 receives modulated encrypted Ethernet communications from the LV PLC bridge 106. Specifically, a power line interface 302 modulates and demodulates encrypted Ethernet communications to and from the power line 102. The power line interface 302 takes the modulated encrypted Ethernet communications that are encrypted by the virtual LV PLC client 206 of the LV PLC bridge 106 and sends the modulated encrypted Ethernet communications to a data encryptor/decryptor 304.

The data encryptor/decryptor 304 demodulates the modulated encrypted Ethernet communications to yield Ethernet communications for use by a device at the customer 110. As mentioned above, because the modulation and demodulation are client specific, if the received modulated encrypted Ethernet communications are not intended for the LV PLC client 108 then the demodulation does not yield Ethernet communications. However, if the modulated encrypted Ethernet communications are intended for the LV PLC client 108, then the Ethernet communications are processed by various functions, namely 306-318, of the LV PLC client 108.

The device controller 306 functions as the intelligence of the LV PLC client 108. The device controller 306 manages the operations of the LV PLC client 108. As mentioned above, the MME data interface 320 communicates with the MME data interface 222 of the LV PLC bridge 106. In an exemplary embodiment, the MME data interface 320 conforms to the HomePlug 1.0 specification.

Still referring to FIG. 3, if the LV PLC client 108 receives Ethernet packets that are destined for use within the LV PLC client 108, then various processes, namely 306-316 of FIG. 3, of the LV PLC client 108 process the Ethernet communications. A web server 310 provides http-based control, configuration, and monitoring of the LV PLC client 108. Further the web server 310 provides for remote configuration, operation, and management of the LV PLC client 108. As is known in the art, a web server 310 is a visualization or a graphical user interface for an underlying process. In this case, the web server 210 is a visualization of a client update manager 308.

The client update manager 308 is the underlying process for remote configuration, operation, and management of the LV PLC client 108. The client update manager 308 allows the LV PLC bridge 106 to remotely provide a firmware upgrade to the LV PLC client 108. The client update manager 308 is responsible for receiving firmware upgrades and validating the correctness of the received firmware upgrade before it is installed in the LV PLC client 108.

A node statistics manager 312 monitors Ethernet communications to collect statistics relating to the operation of the LV PLC client 108. For example, the node statistics manager 312 collects statistics such as a number of successful packets received by the LV PLC client 108, a number of packets destined for the web server 310, and a number of packets destined for an FTP server 314. Further, the node statistics manager 312 maintains the configuration of the LV PLC client 108.

A telnet server 316 provides another vehicle for remote configuration, operation, and management of the LV PLC client 108. The telnet server 316 is a text based user interface whereas the web server 310 is a graphical user interface. The FTP server 314 is a file transfer conveyance that is principally used by the client update manager 308 to receive and send data to and from the LV PLC bridge 106.

Figure 4:
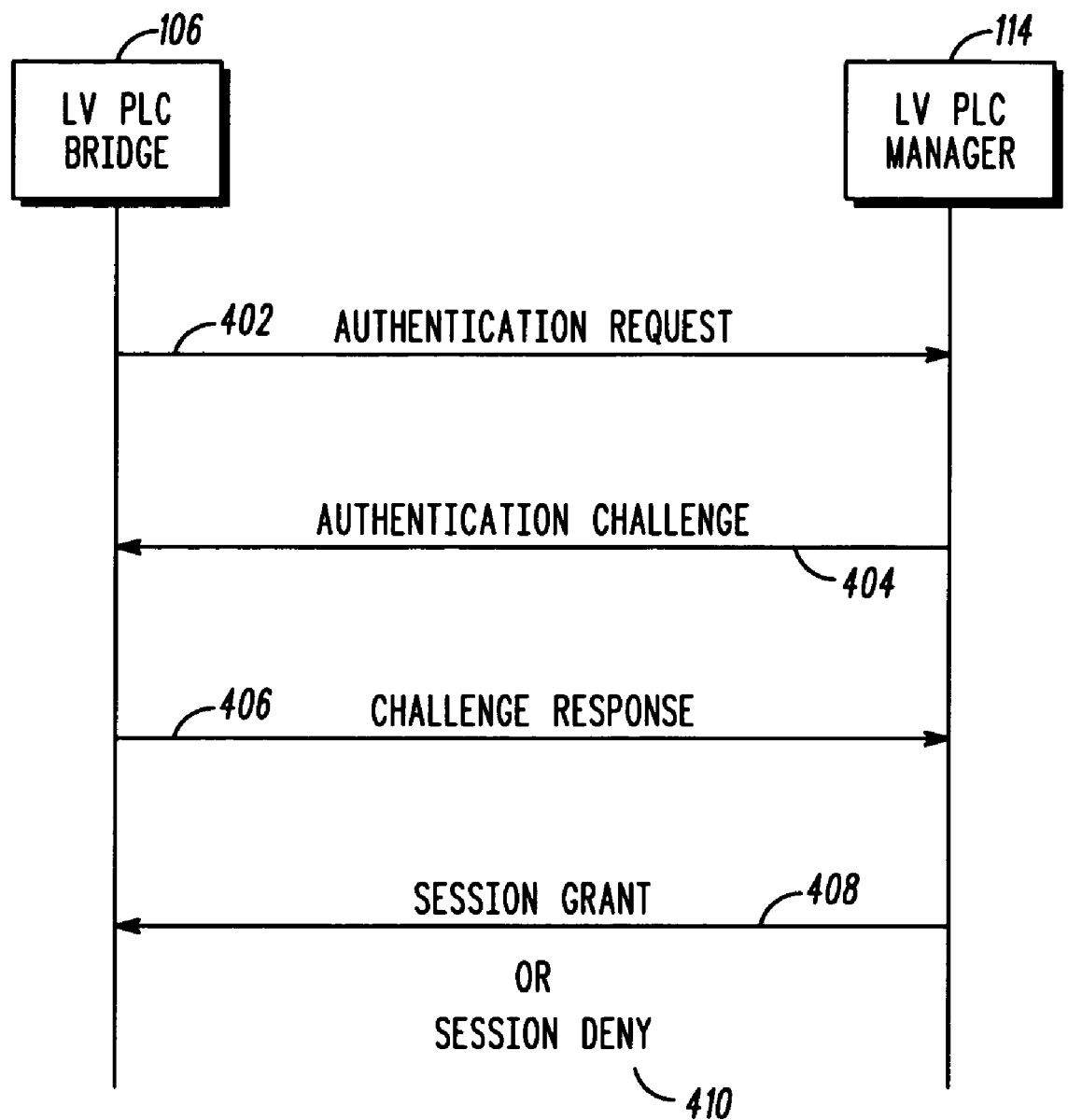
FIG. 4 is an example LV PLC bridge authentication process in accordance with some embodiments of the invention.

Referring to FIG. 4, in operation, the LV PLC bridge 106 powers on and sends an authentication request (message 402) to the LV PLC manager 114 for permission to join the LV PLC system 100. In an exemplary embodiment, the authentication request is an Ethernet data packet that conforms to a Motorola standard where the data packet is destined for the LV PLC manager 114 and has the source IP address of the LV PLC bridge 106. Once the LV PLC manager 114 receives the authentication request (message 402), the LV PLC manager 114 sends an authentication challenge (message 404) to the LV PLC bridge 106. When the LV PLC bridge 106 receives the authentication challenge, the LV PLC bridge 106 knows that it has permission to be managed by the LV PLC manager 114 and thus the LV PLC bridge 106 sends a challenge response (message 406). In response, the LV PLC manager 114 sends either a session grant (message 408) or a session deny (message 410) to the LV PLC bridge 106. If the LV PLC manager 114 determines that the LV PLC bridge 106 is permitted in the LV PLC system 100, then the LV PLC manager 114 sends the session grant (message 408) to the LV PLC bridge 106. Otherwise, the LV PLC manager 114 denies the LV PLC bridge access to the LV PLC system 100 and sends a session deny (message 410).

Figure 5:
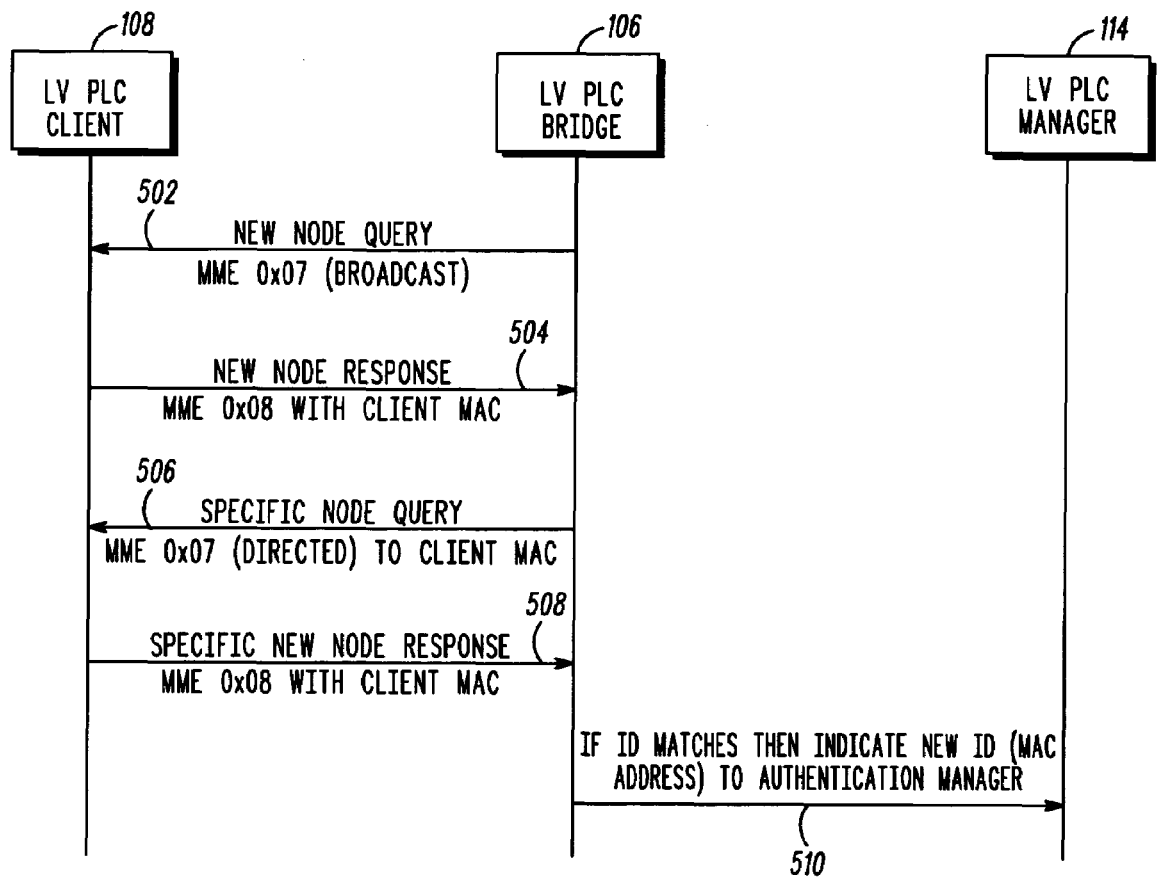
FIG. 5 is an example LV PLC client detection process in accordance with some embodiments of the invention.

Assuming that the LV PLC bridge 106 has authenticated, that is the LV PLC bridge 106 has received a session grant (message 408) from the LV PLC manager 114, then the LV PLC bridge 106 determines the LV PLC clients associated with the LC PLC bridge 106. Referring to FIG. 5, the LV PLC bridge 106 broadcasts a new node query (message 502) to all LV PLC clients 108 on the power line 102. In an exemplary embodiment, the LV PLC bridge 106 broadcasts the new node query (message 502) periodically to the LV PLC clients 108 on the power line 102. In response, each LV PLC client 108 responds with a new node response (message 504). In an exemplary embodiment, the new node response (message 504) comprises at least one of a MAC address and configuration information of the LV PLC client 108. When the LV PLC bridge 106 receives a new node response (message 504) from a LV PLC client 108 that it is not aware of (namely, the LV PLC client 108 has not authenticated with the LV PLC bridge 106), the LV PLC bridge 106 sends a specific node query (message 506) to the new LV PLC client 108. In an exemplary embodiment, the specific node query requests further information about the new LV PLC client 108. In response, the new LV PLC client 108 responds with a specific new node response (message 508).

When the LV PLC bridge 106 receives the specific new node response (message 508) from the new LV PLC client 108, the LV PLC bridge 106 checks to see that the previous response, namely the new node response (message 504), matches the specific new node response (message 508). Specifically, the LV PLC bridge 106 checks to see whether the previously received MAC address from the new node response (message 504) of the new LV PLC client 108 matches that received in the specific new node response (message 508). If it matches, then the LV PLC bridge 106 informs the LV PLC manager 114 of the new LV PLC client 108 by performing an authentication process (message 510, also messages 604-610).

Figure 6:
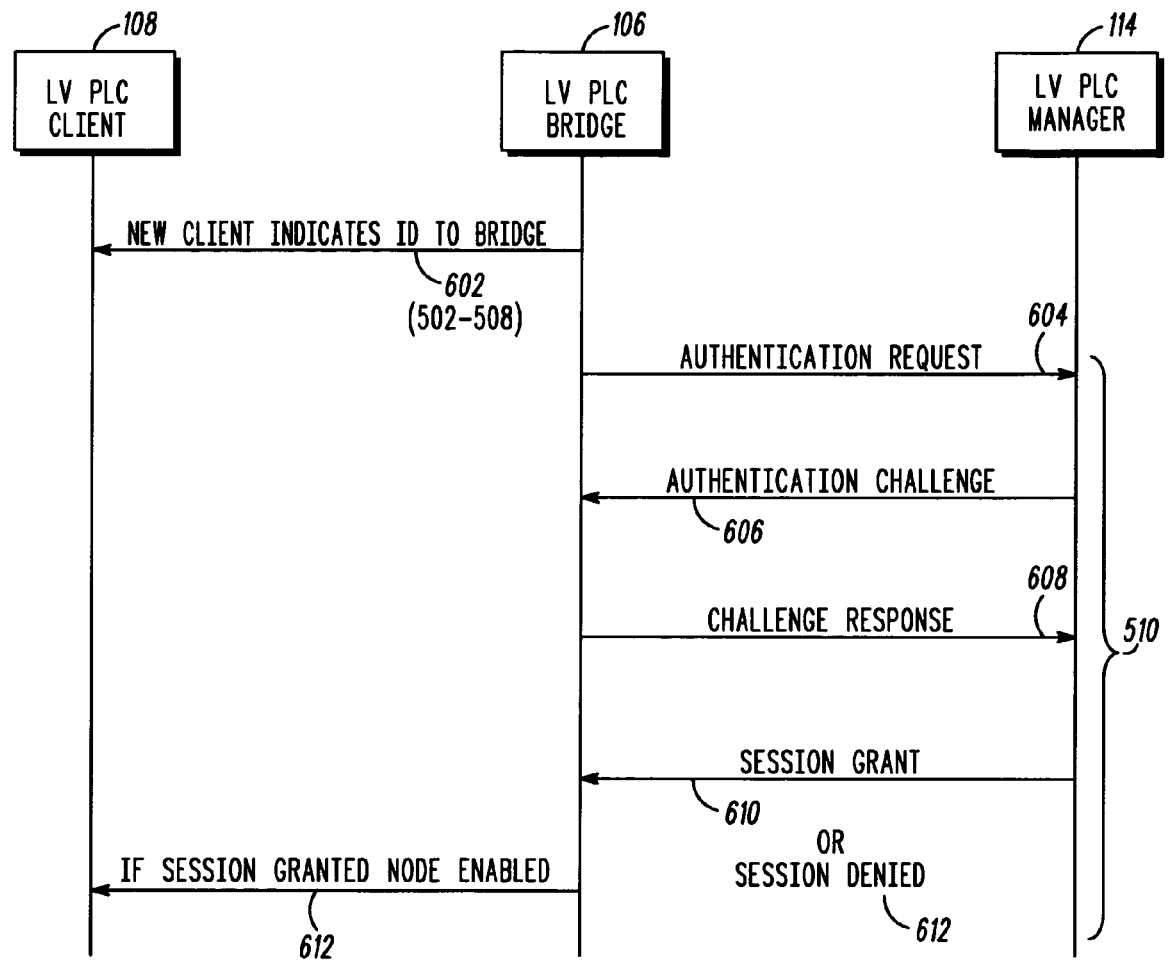
FIG. 6 is an example LV PLC client authentication process in accordance with some embodiments of the invention.

Referring to FIG. 6, when the LV PLC bridge 106 is informed of a new LV PLC client 108 (message 602, also messages 502-508), it informs the LV PLC manager 114 of the new LV PLC client 108. The process performed to authenticate the new LV PLC client 108 is identical to that described with respect to authenticating the LV PLC bridge 106 for operation with the LV PLC system 100 and as shown in FIG. 4.

First, the LV PLC bridge 106 sends an authentication request (message 604) to the LV PLC manager 114 for permission for the new LV PLC client 108 to join the LV PLC system 100. Once the LV PLC manager 114 receives the authentication request (message 604), the LV PLC manager 114 sends an authentication challenge (message 606) to the LV PLC bridge 106 wherein the authentication challenge (message 606) has information for the new LV PLC client 108 (namely a random encryption key). When the LV PLC bridge 106 receives the authentication challenge (message 606), the LV PLC bridge 106 sends a challenge response (message 608). In response, the LV PLC manager 114 sends either a session grant (message 610) or a session deny (message 612) to the LV PLC bridge 106 for the grant or deny of LV PLC services for the new LV PLC client 108. If the LV PLC manager 114 determines that the LV PLC client 108 is permitted in the LV PLC system 100 (e.g. the LV PLC client 108 has paid its bill), then the LV PLC manager 114 sends the session grant (message 610) to the LV PLC bridge 106. Otherwise, the LV PLC manager 114 denies the new LV PLC client 108 access to the LV PLC system 100 and sends a session deny (message 612). Finally, if the LV PLC manager 114 grants the new LV PLC client 108 access to the LV PLC system 100, then the LV PLC bridge 106 notifies the new LV PLC client 108 of the grant (message 612).

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A power line communications (PLC) system for providing broadband communications over a low voltage power line comprising:
   a manager that controls access to a bridge for a client;
   the bridge that communicates with the manager to provide the client Internet access whereby the bridge modulates Ethernet communications from the Internet access to the low voltage power line to provide the modulated Ethernet communications to the client; and
   the client that demodulates modulated Ethernet communications from the low voltage power line to yield Ethernet communications,
   wherein the manager and the bridge are in communication with the Internet access, and
   wherein the bridge and client are operatively connected to the low voltage power line.

2. The PLC system of claim 1 wherein the Internet access provides wireless Internet access between an Internet communications network and the bridge.

3. The PLC system of claim 2 wherein the wireless Internet access is communicated using orthogonal frequency division multiplexing (OFDM).

4. The PLC system of claim 1 wherein the bridge demodulates modulated Ethernet communications from the low voltage power line.

5. The PLC system of claim 1 wherein at least one of the bridge and the client modulates Ethernet communications according to a HomePlug specification.

6. The PLC system of claim 1 further comprising at least one device to receive Ethernet communications from the client.

7. The PLC system of claim 1 wherein the bridge further comprises a virtual client of the client wherein the virtual client performs client specific encryption and decryption of the Ethernet communications.

8. The PLC system of claim 1 wherein the bridge further comprises at least one of a web server, a user data router, a low voltage power line interface, an Internet access interface, an update manager, a simple network management protocol (SNMP) manager, a telnet server, an ftp server, and an MME interface.

9. The PLC system of claim 1 wherein the bridge further comprises an authenticator that communicates with the manager to authenticate the client.

10. The PLC system of claim 1 wherein the client further comprises at least one of a device controller, a low voltage power line interface, a data encryptor/decryptor, an Ethernet interface, a client update manager, a web server, a node statistics manager, a telnet server, an ftp server, and an MME interface.

11. A method for providing broadband communications over a low voltage power line comprising:
  controlling access to a bridge for a client;
  at the bridge:
    communicating with the manager to provide the client Internet access;
    modulating Ethernet communications from the Internet access to the low voltage power line to provide the modulated Ethernet communications to the client; and
  demodulating by the client the modulated Ethernet communications from the low voltage power line to yield Ethernet communications,
  wherein the manager and the bridge are in communication with the Internet access, and
  wherein the bridge and the client are operatively connected to the low voltage power line.

12. The method of claim 11 wherein the Internet access is a wireless communications network.

13. The method of claim 11 wherein the step of modulating is performed according to a HomePlug specification.

14. The method of claim 11 further comprising encrypting the Ethernet communications before the step of modulating.

15. The method of claim 14 wherein the step of encrypting is client specific.

16. The method of claim 11 further comprising decrypting the demodulated Ethernet communications after the step of demodulating.

17. A method for providing broadband communications over a low voltage power line comprising:
  at a bridge:
    modulating Ethernet communications for transmission over the low voltage power line;
    receiving modulated Ethernet communications from the low voltage power line; and
    demodulating the modulated Ethernet communications,
  the method further comprising at least one of the following steps:
    providing at least one of a web server, ftp server, and telnet server for the bridge;
    allowing for at least one of remote configuration, remote operation, and remote management of the bridge;
    monitoring the Ethernet communications sent and received by the bridge to collect statistics relating to the Ethernet communications; and
    providing a MME data interface to send and receive packetized communications from a client of the bridge.

18. A method for providing broadband communications over a low voltage power line comprising:
  at a bridge:
    modulating Ethernet communications for transmission over the low voltage power line;
    receiving modulated Ethernet communications from the low voltage power line; and
    demodulating the modulated Ethernet communications,
  the method further comprising providing authentication of a client wherein the authentication comprises:
  receiving a client address from a client of the bridge;
  sending an authentication request to a manager of the bridge, wherein the authentication request comprises the client address; and
  receiving a message from the manager informing the bridge whether the client is granted access to the bridge so that the bridge can provide Internet access to the client.

* * * * *